United States Patent [19]

Sato et al.

[11] 3,987,233

[45] Oct. 19, 1976

[54] METHOD FOR PRODUCING ETHYLENE POLYMERS

[75] Inventors: Akihiro Sato, Chiba; Hiroshi Shimizu; Atsuyuki Kachi, both of Ichiharashi, all of Japan

[73] Assignee: Chisso Corporation, Osaka, Japan

[22] Filed: Apr. 29, 1975

[21] Appl. No.: 572,818

[30] Foreign Application Priority Data

May 8, 1974    Japan................................ 49-50994

[52] U.S. Cl. ............................. 526/97; 252/429 B;
252/429 C; 526/114; 526/115; 526/121;
526/122; 526/124; 526/125; 526/347;
526/348; 526/350; 526/352; 526/906
[51] Int. Cl.² .................... C08F 4/02; C08F 10/02
[58] Field of Search............. 260/85.3, 88.2, 94.9 C,
260/94.9 E, 94.9 DA

[56] References Cited
UNITED STATES PATENTS

| | | | |
|---|---|---|---|
| 3,718,636 | 2/1973 | Stevens et al. ............... | 260/94.9 DA |
| 3,900,454 | 8/1975 | Sato et al. ...................... | 260/94.9 E |
| 3,907,759 | 9/1975 | Okada et al. .................... | 260/94.9 C |

*Primary Examiner*—Edward J. Smith
*Attorney, Agent, or Firm*—Fred Philpitt

[57] ABSTRACT

In a method for producing a polymer or a copolymer of ethylene carried out in the presence of a catalyst obtained by a combination of a solid product containing a transition metal of the fourth *a* or fifth *a* group and an organoaluminum compound, an improvement has been made to provide a catalyst having such an efficiency as being capable of omitting ash-removal step and providing a high production yield of polymer per unit volume of polymerization vessel per hour and a polymer having a high B.D. Said catalyst can be obtained by (i) reacting a halide of trivalent metal (A) with a divalent metal compound or its derivative (B) such as hydroxide, oxide or carbonate thereof, or hydrate of these, to produce a solid product (I); (2) reacting said solid product (I) with a chain or cyclic polysiloxane having a general formula of

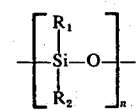

wherein $R_1$ and $R_2$ are same or different kinds, and each mean hydrogen atom, alkyl, aryl, halogen atom, alkoxy, aryloxy radical or a residual radical of an aliphatic carboxylic acid and $n$ is a number in the range of 3–10,000 to produce a solid product (II), and (3) further reacting said solid product (II) with a liquid transition metal compound (D) to produce a solid product (III).

18 Claims, No Drawings

METHOD FOR PRODUCING ETHYLENE POLYMERS

DESCRIPTION OF THE INVENTION

This invention relates to a production method of ethylene polymers. More particularly it relates to a novel production method of ethylene polymers which provides a extremely high catalyst efficiency.

Polymerization and polymer of ethylene hereinafter referred to include not only homopolymerization and homopolymer of ethylene but also copolymerization or copolymer of ethylene and a small amount of other olefins (including diolefins) copolymerizable with ethylene.

We disclosed a method for polymerizing α-olefin in the presence of a catalyst in which a reaction product obtained by reacting a reaction product between (A) a halide of trivalent metal and (B-1) a hydrate of halide or a hydroxide of a metal belonging to groups 1 – 8 of periodical table, with a transition metal compound and combining the resulting reaction product with (C) an organoaluminum compound (Japanese patent publications Nos. 13609/1972 and 13772/1972). Further we disclosed a method in which instead of (B-1), (B-2) oxide, carbonate and/or hydrogen carbonate is used, and resultant solid product, is used as one component of the catalyst with accompaniment of easiness of operation but without accompaniment of disadvantageous dehydrochlorination or the like (Japanese patent publication No. 11806/1972 and Japanese patent application No. 20379/1970).

These methods provide a high utilization efficiency of a transition metal compound, notable effectiveness of molecular weight reduction by way of hydrogen, no forming of polymer scale on the wall of polymerization vessel or the like.

A principal object of the present invention is to provide a production method of ethylene polymers in which a much higher catalyst efficiency than those of the above-mentioned prior arts methods can be attained and the step of elimination of remaining catalyst in ethylene polymer, i.e., ash removal step can be omitted. Another object is to provide a method in which the shape of resulting ethylene polymer is improved, the concentration of ethylene polymer in the polymerization vessel is increased and the amount of production of ethylene per polymerization vessel per hour is increased.

The above-mentioned prior methods disclosed by us provides a sufficiently high utilization efficiency of transition metal compounds but yield of ethylene polymer per solid product was not always sufficient and thus the step of the elimination of remaining catalyst in ethylene polymer could not completely be omitted. When the production of ethylene polymer is carried out with the catalyst obtained according to the above-mentioned prior application, since the shape of resulting polymer powder is not good, i.e., it is bulky, the concentration of slurry of ethylene polymer in a polymerization vessel cannot be elevated sufficiently. Thus there was a drawback in the point that the production capacity of ethylene polymer per unit volume of polymerization vessel and per unit time is poor.

The present invention provides a method in which the above-mentioned drawback can be overcome, and not only the utilization efficiency of transition metal compound is extremely high but also yield of ethylene polymer per solid product is sufficiently high and shape of ethylene polymer is improved.

The use of polysiloxane as one component of catalyst in the polymerization of ethylene by way of a Ziegler type catalyst has been known. For example, Japanese patent publications Nos. 18547/1961, 3393/1962, 2993/1962, 7635/1963, 4192/1963, 23091/1964, 25909/1965, 25910/1965, 27527/1965, 12635/1966, 14589/1966 and the like.

These various inventions have objects in the points of improvement for poor yield of polymerization catalyst and short time activity thereof, production of polyethylene having a large bulk density and improvement of reproducibility of distribution and absolute value of molecular weight of polyethylene. The constitution of these various inventions is briefly classified into two kinds. One is a process for producing a catalyst for polymerization of ethylene obtained by adding a polysiloxane to a catalytic system consisting of a compound of a metal of groups 4 to 6 of periodical table (e.g., $TiCl_4$, $TiCl_3$) and alkylaluminum (for example, Japanese patent publications Nos. 18547/1961, 3393/1962, 20496/1963, 25909/1965, 12635/1966, 14589/1966, etc.). The other is a process in which a reaction product of polysiloxane and a compound of a metal of group 3b (e.g., $AlCl_3$, etc.) is used as one component to be combined with a compound of a metal of groups 4 to 8 of periodical table (for example, Japanese patent publications Nos. 7635/1963, 27527/1965). This class includes also a process for polymerizing ethylene with a catalyst prepared by reacting a compound of a metal of groups 4 – 8 of periodical table and a compound of a metal of group 3b of periodical table, and adding a polysiloxane to the reaction product (Japanese patent publication No. 27527/1965).

According to these inventions, there are drawbacks. Since $TiCl_4$ is used, as it is, as a catalyst component, polymerization activity per titanium is reduced and if ash removal step is omitted, a large amount of titanium atom remains in polymer resulting in the discoloration of polymer and further since polysiloxane goes into solvent it is accumulated therein.

According to a method disclosed in Japanese patent publication No. 7635/1963, a compound of a metal of group 3b of periodical table (e.g., $AlCl_3$) is used to react with a polysiloxane and it is known that both react to dissolve solid matter, and a catalyst capable of polymerizing ethylene is prepared by reacting the reaction product with a compound of a metal of groups 4 – 8a of periodical table.

According to a process disclosed in Japanese patent publication No. 27527/1965, a compound of a metal of groups 4 – 8a of periodical table and a compound of a metal of group 3b (e.g., $AlCl_3$) is reacted and then a polysiloxane is added to the reaction mixture to effect further reaction whereby a catalyst capable of polymerizing ethylene is prepared as in Japanese patent publication No. 7635/1963.

In contrast, in the catalyst of the present invention, a trivalent metal halide reacts with a divalent metal compound completely and the trivalent metal halide is used in a solid matter wherein the halide does not remain as it is. The reaction product of this trivalent metal halide and the divalent metal compound is a substantially insoluble solid product at the time of catalyst preparation and polymerization of ethylene. After reacted with a polysiloxane, it carries a compound of a metal of groups 4a – 5a of periodical table as a support.

Namely, in the catalyst of the present invention, a polysiloxane is used as one component but it is used for the reaction with a solid product having no remaining trivalent metal halide, and a transition metal compound is carried on a solid product obtained by reacting the above solid product with polysiloxane. If polymerization of ethylene is carried out with a solid product having a transition metal compound supported on the surface thereof, polymerization activity per transition metal compound per hour is generally high even when only a small amount of the transition metal compound is present. However, in case of a solid product obtained by reacting a trivalent metal halide with a divalent metal compound or its derivative such as hydroxide, oxide or carbonate thereof, or hydrate of these, an extremely higher catalyst efficiency can be provided by reacting the polysiloxane before supporting a transition metal compound and then supporting the transition metal compound on the resulting solid product containing polysiloxane.

The present invention resides in a method for producing a polymer of copolymer of ethylene which comprises polymerizing ethylene or copolymerizing ethylene with another olefin in the presence of a catalyst obtained by combining a solid product containing a transition metal of Group 4a or Group 5a of the Periodic Table, with an organoaluminum compound, which method is characterized by using as said solid product, a solid product (III) obtained by (1) reacting a halide of a trivalent metal (A) with a divalent metal compound or derivative thereof (B) selected from the group consisting of hydroxides, oxides and carbonates of a divalent metal, double oxides consisting of a divalent metal oxide and another valent-metal oxide, hydrates of halides of a divalent metal, hydrates of double halides consisting of a divalent metal halide and another valent-metal halide, hydrates of addition compounds of an oxide to a halide, of a divalent metal, hydrates of double oxides consisting of oxides selected from those of divalent metals, hydrates of addition compounds of a carbonate to a hydroxide, of a divalent metal, and hydrates of hydroxidecarbonate containing a divalent metal to obtain a solid product (I), (2) reacting the resulting solid product (I) with a chain or cyclic polysiloxane (C) expressed by the general formula,

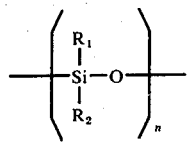

wherein $R_1$ and $R_2$ are same or different kinds and each mean hydrogen atom, alkyl group, aryl group, halogen atom, alkoxy group, aryloxy group or aliphatic carboxylic acid residual radical, and n is in the range of 3 – 10,000, to obtain a solid product (II), and (3) reacting the resulting solid product (II) with a liquid transition metal compound (D) to obtain said solid product (III).

As seen from the foregoing, components constituting the catalyst of the method of the present invention are classified into the following four groups:

| group 1 | (A) | trivalent metal halide |
| --- | --- | --- |
| | (B) | divalent metal compound or its derivative such as hydroxide, oxide or carbonate |
| | | thereof or hydrate of these. |
| group 2 | (C) | polysiloxane |
| group 3 | (D) | liquid compound of transition metal of groups 4a and 5a of periodical table |
| group 4 | (E) | organoaluminum compound |

Description will be given to the preparation method of the catalyst useful in the present invention. At first brief explanation will be given.

Said trivalent metal halide (A) and said divalent metal compound or its derivative of group 1 are mixed and ground at a temperatue of room temperature to 500° C by using a ball mill, a vibration mill, etc. After reacting the solid product (I) obtained by reacting both the components (A) and (B), to the utmost so as not to leave unreacted (A) with polysiloxane (C) of group 2, solid product (II) is obtained by eliminating unreacted polysiloxane by washing with a solvent such as n-hexane and the like. After reacting this solid product (II) and a transition metal compound (D) of group 3, the resultant is filtered, repeatedly washed with a solvent such as n-hexane or the like until no more free transition metal compound can be detected, and then dried. A catalyst of the present invention is obtained by combining the resulting solid product (III) with an organoaluminum compound (E) of group 4.

More detailed explanation will be made. Trivalent metal halides (A) of group 1 include aluminum trichloride (anhydrous), ferric trichloride (anhydrous).

Divalent metal compounds (B) include, for example, hydroxides such as $Mg(OH)_2$, $Ca(OH)_2$, $Zn(OH)_2$ and $Mn(OH)_2$, oxides such as $MgO$, $CaO$, $ZnO$ and $MnO$, double oxides containing divalent metal such as $MgAl_2O_4$, $Mg_2SiO_4$ and $Mg_6MnO_8$, carbonates such as $MgCO_3$, $MnCO_3$, $MgCO_3$ and $CaCO_3$, hydrates of halides such as $SnCl_2.2H_2O$, $MgCl_2.6H_2O$, $NiCl_2.6H_2O$, $MnCl_2.4H_2O$ and $KMgCl_3.6H_2O$, hydrates of double salts containing an oxide and a halide such as $8MgO.MgCl_2.15H_2O$, hydrates of double oxides containing a divalent metal oxide such as $3MgO.2SiO_2.2H_2O$, hydrates of double salts of carbonate and hydroxide such as $3MgCO_3.Mg(OH)_2.3H_2O$ and hydrates of hydroxy carbonate containing divalent metal such as $Mg_6Al_2(OH)_{16}CO_3.4H_2O$.

Mixing and grinding, as a pretreatment for reacting (A) a trivalent metal halide and (B) a divalent metal compound are preferably carried out for 5 – 50 hours in case of a ball mill and 1 – 10 hours in case of a vibration mill to bring to sufficiently mixed state. As for mixing ratio of (A) and (B) in group 1, atomic ratio of divalent metal of (B) to trivalent metal of (A) will be usually sufficient if it is in the range of 0.1 to 20, preferably 1 – 10. The reaction temperature is usually in the range of 20° to 500° C, preferably 50° to 300° C. The reaction time of 30 min. to 50 hours is suitable. If a reaction temperature is low, reaction is carried out for a long time sufficiently not to leave unreacted trivalent metal and resulting solid product is used as solid product (I).

The solid product (I) obtained by the reaction of (A) and (B) of group I is then reacted with polysiloxane (C) of group 2.

The polysiloxane used as (C) of group 2 in the present invention is a chain or cyclyc siloxane polymer represented by the general formula of

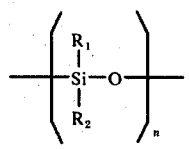

wherein $n$ is 3 – 10,000, $R_1$ and $R_2$ are same or different groups capable of connecting with silicon, but among them, those having one or more kinds of hydrogen, hydrocarbon radical (such as alkyl and aryl), halogen, alkoxy, aryloxy, residual group of aliphatic carboxylic acid, distributed and connected in one molecule in various ratios, are used.

Explanation will be made in detail further as to the above-mentioned polysiloxane.

Those which are usually used as polysiloxane are the ones in which each R of the above-mentioned formula is hydrocarbon radical, such as alkylsiloxane polymer, alkylarylsiloxane polymer, arylsiloxane polymer. Illustrative alkylsiloxanes include, for example, lower polymers such as octamethyltrisiloxane $CH_3[Si(CH_3)_2O]_2$-$Si(CH_3)_3$, octaethylcyclotetrasiloxane $[Si(C_2H_5)_2O]_4$ and polmers such as dimethylpoly siloxane $[Si(CH_3)_2O]_n$, ethylpolycyclosiloxane $[SiH(C_2H_5)O]_n$, methylethylpolysiloxane $[Si(CH_3)(C_2H_5)O]_n$. Illustrative arylsiloxane polymers include, for example, hexaphenylcyclotrisiloxane $[Si(C_6H_5)_2O]_3$, diphenylpolysiloxane $[Si(C_6H_5)_2O]_n$. Illustrative alkylarylsiloxane polymers include, for example, diphenyloctamethyltetrasiloxane $(CH_3)_3SiO[Si(CH_3)(C_6H_5)O]_2$-$Si(CH_3)_3$, methylphenylpolysiloxane $[Si(CH_3)(C_6H_5)O]_n$. Further, alkylhydrogensiloxane polymers, haloalkylsiloxane polymers or haloarylsiloxane polymers wherein $R_1$ is hydrogen or halogen atom and $R_2$ is a hydrocarbon radical such as alkyl, aryl, etc., are illustrated. Furthermore, polysiloxanes wherein each R is an alkoxy, aryloxy or fatty acid radical, can be used.

Such various polysiloxanes can be used also in admixture thereof.

Polysiloxanes to be used are preferably in a liquid state. The viscosity (at 25° C) is suitably in the range of 10 – 10,000 centistokes, preferably in the range of 10 – 1,000 centistokes.

The reaction of the solid product (I) with polysiloxanes is carried out usually at 20° to 300° C, preferably at 60° to 200° C, and a reaction time in the range of 10 minutes to 5 hours is sufficient. As for the ratio of amounts of the solid product (I) and polysiloxanes, it is preferable to add 10 g to 1,000 g of polysiloxanes to 100 g of the solid product (I). Further, the reaction of the solid product (I) with polysiloxanes can be carried out also in the presence of a solvent. Even when a solvent is existent, the effectiveness of the present invention is not injured.

As for solvents to be used, aliphatic hydrocarbons such as n-heptane, n-octane, n-nonane, n-decane etc., and aromatic hydrocarbons such as benzene, toluene, xylene, ethylbenzene, cumene, etc., can be used. In addition, halogenated aromatic hydrocarbons such as chlorobenzene, o-dichlorobenzene, etc., and halogenated hydrocarbons such as carbon tetrachloride, chlorform, dichloroethane, trichloroethylene, tetrachloroethylene, carbon tetrabromide, etc., can be also used.

Reaction can be carried out by adding such solvents and siloxanes at the same time. As for the mixing ratio, it is preferable that the amounts of solvent and polysiloxane are in the ranges of 0 to 1,000 ml and 10 to 1,000 g, respectively, based upon 100 g of the solid product (I). Further, after reaction of polysiloxanes with the solid product (I), a solvent can be added. To the contrary, after addition of a solvent to the solid product (I), polysiloxanes can be added, and then reaction can be carried out.

A solid obtained by the reaction of the solid product (I) with polysiloxanes is now referred to as solid product (II). After the reaction of the solid product (I) with a polysiloxane, the resulting mixture of solid product (II) and unreacted polysiloxane which is in the slurry state, can be used for a subsequent reaction thereof with a transition metal compound of (D) of group 3 mentioned below. Alternatively, after the reaction of the solid product (I) with polysiloxanes, the resulting reaction mixture can be subjected to filtration to remove unreacted polysiloxane, then to washing with a solvent such as n-hexane and the resulting solid product (II) can be taken out to be used in a subsequent reaction with a transition metal compound of (D) of group 3. The amount of the solid product (II) taken out as above is usually in the range of about 101 – 105 g when the solid product (I) is used in an amount of 100g. Namely, about 1 – 5 g of polysiloxane forms a component constituting the solid product (II).

As for the transition metal compound of (D) of group 3, a liquid compound is used for the reaction with the solid product (II), and there can be illustrated halides, oxyhalides, alcoholates, alkoxyhalides, acetoxyhalides, etc., of Ti or V, such as titanium tetrachloride, titanium tetrabromide, tetraethoxytitanium, tetrabutoxytitanium, monochloro-tributoxytitanium, dichlorodibutoxytitanium, trichloro-monoethoxytitanium, vanadium tetrachloride, oxytrichlorovanadium, etc.

The mixing ratio of the transition metal compound of (D) of group 3 (which will hereinafter be abbreviated as "transition metal compound") to the solid product (II) is desirably in the range of 1 to 1,000 g (0.58 to 576 ml) based upon 100 g of the solid product (II), more desirably in the range of 10 to 500 g (5.76 to 288 ml).

As for the conditions of the reaction between the solid product (II) and the transition metal compound, the reaction temperature is usually in the range of 50 to 300° C, preferably in the range of 80 to 200° C and a reaction time in the range of 10 minutes to 5 hours is sufficient.

At the time of this reaction which is carried out by mixing the solid product (II) with the transition metal compound, there can be added a solvent such as aliphatic or aromatic hydrocarbons, e.g., n-hexane, n-heptane, n-nonane, benzene, toluene, xylene, ethylbenzene, cumene, etc., halogenated hydrocarbons, e.g., chlorobenzene, o-dichlorobenzene, chloroform, carbon tetrachloride, dichloroethane, trichloroethylene, tetrachloroethylene, etc., in order to easen the mixing for the reaction. The amount of solvent to be added is in the range of 0 to 1,000 ml based upon 100 g of the solid product (II).

After completion of the reaction of the solid product (II) with the transition metal compound, unreacted transition metal compound or the said compound and the solvent are separated by filtration, followed by repeated washings with a solvent such as n-hexane to remove a trace amount of liberated transition metal compound. The resulting solid is referred to as solid product (III).

The solid product (III) is combined with an organoaluminum compound of (E) of group 4.

As for the organoaluminum compound, there can be illustrated trialkylaluminums such as trimethylaluminum, triethylaluminum, triisobutylaluminum, trihexylaluminum, etc., dialkylaluminum monochlorides such as diethylaluminum monochloride, etc., ethylaluminum sesquichloride, ethylaluminum chloride, etc. In addition to these, alkoxy-alkylaluminums such as monoethoxydiethylaluminum, diethoxy-monoethylaluminum, etc., can be also used.

The catalyst thus obtained is used for producing ethylene polymers.

As for a small amount of another olefin copolymerizable with ethylene, to be used for ethylene copolymer, there can be illustrated propylene, butene-1, hexene-1, octene-1, decene-1 and other straight chain monoolefins, branched chain monoolefins such as 4-methylpentene-1, etc., diolefins such as butadiene, etc.

Polymerization reaction is carried out usually in a hydrocarbon solvent such as n-hexane, n-heptane, n-octane, etc., and the reaction is carried out at a polymerization temperature in the range of room temperature to 150° C and under a polymerization pressure of atmospheric pressure to 50 Kg/cm$^2$. In the polymerization, the molecular weight of the resulting polymer can be controlled by adding a suitable amount of hydrogen to the polymerization system.

As for the effectivenesses of the present invention, the yield of ethylene polymers based upon the unit weight of solid product (III) is sufficiently high and amounts to about $8 \times 10^3 - 5 \times 10^4$ g (polymer)/g (solid product (III)) under usual polymerization conditions. Thus, by making smaller the amount of catalyst used for polymerization, even if removal of catalyst residue in ethylene polymer i.e., ash-removing step, after completion of ethylene polymerization, is omitted, no coloration of polymer occurs, nor are observed bad influences such as spoiling of physical properties of polymer, rusting of die at the time of shaping of polymer, etc. According to the prior patent application filled by us, the yield of ethylene polymer based upon the unit weight of solid product has been at the highest, $5 \times 10^3$ g (polymer)/g (solid product), under usual conditions of polymerization, and omission of ash-removing step has often resulted in coloration of polymer. According to the present invention, such a drawback has been completely overcome. Thus it is evident that the present invention provides a notable improvement.

Whether omission of ash-removing step gives rise to coloration of polymer or not, may be judged by means of naked eyes, but comparison can be made through the measurement of yellow index (which will hereinafter be abbreviated as YI). The closer the YI to zero, the smaller the coloration of polymer. For example, polymer having a YI of 10 or more can hardly be applied to practical use due to coloration even when the ash-removing step of polymer has been omitted and yet it has a YI in the range of 0 to 5, then said polymer can be said to be a polymer having a small coloration. According to the present invention, even when ash-removing step is omitted, the value of YI is in the range of 0 to 5. Thus, the present invention provides a remarkably improved process in that polymer having a remarkably small coloration can be obtained.

Another effectiveness of the present invention is in the improvement of the shape of ethylene polymer. If the shape of ethylene polymer is inferior, polymer becomes bulky, and the concentration of ethylene polymer (slurry concentration) in the polymerization vessel cannot be increased at the time of polymerization and the amount of polymer produced, per unit volume of polymerization vessel, per unit time, is reduced, and this means reduction in production efficiency, and further, various troubles occur such as clogging of transportation pipings of polymer, difficulty of constancy of transportation amount of polymer, difficulty of normal pelletizing operation at the time of pelletizing of powders, etc. Whether the shape of polymer is good or not can be judged by means of naked eyes but it can also be judged by measuring bulk density of polymer (which will hereinafter be abbreviated as BD). Namely, the smaller the value of BD of polymer, the worse the shape of polymer. The better the shape of polymer, the larger the value of BD of polymer.

Accordingly, if BD of polymer is 0.3 or more, preferably 0.35 or more, it can be said that the shape of polymer has been improved. According to the abovementioned method of the prior patent application invented by the present inventors, BD of ethylene polymer has been improved to give 0.25 – 0.33, but, according to the present invention, BD has been further improved to give a sufficiently high value as high as 0.35 – 0.45. As the result of the improvement in the shape of ethylene polymer, the slurry concentration in the ethylene polymerization vessel has been further increased, whereby the amount of polymer produced has been not only increased, but also the troubles at the time of polymer transportation and at the time of pelletization have been overcome. This is one of the remarkable effectivenesses of the present invention.

The present invention will be further illustrated by the following Examples.

EXAMPLE 1

1. Preparation of a solid product

Anhydrous aluminum trichloride (80 g) and 58 g of magnesium hydroxide were mixed and crushed in a vibrating mill for 5 hours, then heated at 130° C for 10 hours, whereby reaction took place with dehydrochlorination. After heating was terminated, the mixture was cooled under nitrogen stream and finely divided to give a solid product (I). Into a 500-ml round-bottomed flask were placed 100 g of the solid product (I), 100 g of chain dimethylpolysiloxane (Toshiba silicon oil TSF 451–100 having a viscosity of 100 centistokes, a trademark of product manufactured by Tokyoshibaura Denki Kabushiki Kaisha), and 100 ml of toluene. The mixture was reacted at 120° C for 2 hours to yield a solid product (II). After the reaction was completed, the reaction mixture was decanted, and 200 ml of n-hexane was added to the residue. Decantation and n-hexane addition were repeated 4 times to remove unreacted polysiloxane. TiCl$_4$ (200 ml) was added to the remaining solid, and the mixture was heated and reacted at 110° C for an hour. After completion of the reaction, a solid product (III) was obtained by filtering the reaction mixture in a dry box in which air has been substituted with nitrogen. The product was repeatedly washed with n-hexane until there is no titanium detected in the filtrate, and dried under a reduced pressure for an hour. The solid product (III) contained 7.7 mg of titanium atoms per gram of the solid product (III).

2. Polymerization of ethylene

Air was evacuated from a 5-liter stainless steel reactor, and was substituted with nitrogen gas. Thereto were added 3.5 liters of n-hexane, 380 mg of triethylaluminum, and 37 mg of the solid product (III). The reactor was sealed, and polymerization was conducted at 85° C for 5 hours under a hydrogen gauge pressure of 3 Kg/cm$^2$ and an ethylene gauge pressure of 10 Kg/cm$^2$ (i.e., a total gauge pressure of 13.8 Kg/cm$^2$). After the reaction was completed, the slurry containing an ethylene polymer was filtered without deashing and dried to yield 840 g of a white polymer. The yield of polymer per gram of the solid product (III) was 22,700 g, and the catalyst efficiency was extremely high. Furthermore, the polymer yield per gram of titanium atoms in the solid product (III) was $2.9 \times 10^6$ g (polymer)/g (Ti atom), also indicating extremely high catalyst efficiency and superior effectiveness of the present invention. The polymer obtained had a good shape and a uniform particle size range, wherein more than 90% of the polymer had sizes between 35 and 150 mesh. The polymer had a BD as high as 0.43. Even if the deashing step is omitted, the polymer was less colored and white, with a measured yellowness index (YI) of 0.4. Without deashing step, the polymer produced can be put to practical use. It had a melt index (MI) of 4.8.

COMPARATIVE EXAMPLE 1

Into a 500-ml round-bottomed flask were added 100 g of the solid product (I) obtained in Example 1, 200 ml of TiCl$_4$, and 100 ml of toluene, and the same procedure as in Example 1 was followed, except that the reaction with dimethylpolysiloxane was omitted and the mixture was reacted at 110° C for an hour, thereby giving the solid product (III). (It had a Ti atom content of 5.0 mg/g.)

Using the above solid product, ethylene was polymerized as in Example 1 to give a polymer yield of 4,250 g/g of the solid product. The catalyst efficiency was less than a fifth of that in Example 1. In addition, the polymer had a MI of 0.15 which was as low as 1/30 or less of the MI obtained in Example 1.

The polymer had a BD of 0.21 which was smaller than in Example 1, and had a bad shape. It also had a yellowness index (YI) of 7.5. As compared with the polymer obtained in Example 1, it was remarkably colored, and thus deashing process was found to be essential. It has been found from these results that the present invention has outstanding effectiveness.

COMPARATIVE EXAMPLE 2

Using a polysiloxane-free solid product obtained in Comparative Example 1, ethylene was polymerized by adding polysiloxane to the polymerization mixture. Following the similar polymerization procedure as in Example 1, but substituting 42 mg of the solid product obtained in Comparative Example 1 and 80 mg of polysiloxane (TSF 451-100 used in Example 1) for the solid product (III) of Example 1, there was obtained 3,850 g of polymer per gram of the solid product. The catalyst efficiency was remarkably lower than in Example 1. The polymer had a MI of 0.18. Therefore, even if polysiloxane is added, at the time of polymerization, in a similar manner to those of the above-mentioned prior applications (e.g., Japanese patent publication Nos. 18547/1961, 3393/1962, 20496/1963, 25909/1965, 12635/1966, 14589/1966, etc.), the polymerization activity is contrarily reduced even as compared with no addition of polysiloxane in Comparative Example 1, and further the polymerization activity (ethylene polymer yield per gram of the solid product) was as low as about one-sixth of that in Example 1. Thus the addition of polysiloxane at the time of polymerization has effectiveness remarkably lower than the present invention.

COMPARATIVE EXAMPLE 3

Using a polysiloxane-free solid product obtained in Comparative Example 1 as the titanium atom-containing component, and also using a product obtained by reacting polysiloxane hydride with a halide of a IIIb group element, ethylene was polymerized in a similar manner as in Japanese patent publication No. 7635/1963.

1. Reaction of methyl polysiloxane hydride with aluminum trichloride

To 50 ml of well deaerated and purified decane were added 21.3 g of methyl polysiloxane hydride (Toshiba silicon oil TSF 484 having a viscosity of 16 centistokes, a trademark of product manufactured by Tokyoshibaura Denki Kabushiki Kaisha) and 6.4 of anhydrous aluminum trichloride, and the mixture was heated to 180° C and reacted for an hour under nitrogen stream to form a solution which was subsequently cooled.

2. Ethylene polymerization

A small amount of residue was filtered off from the above solution. Using a syringe in which air has been substituted with nitrogen, the solution was taken so as to give 450 mg of the reaction product of methyl polysiloxane hydride - aluminum trichloride. The solution was put into the polymerization reactor used in Example 1, and 50 mg of the solid product obtained in Comparative Example 1 was added thereto. The polymerization was conducted as in Example 1 to give only 2.3 g of an ethylene polymer. The polymer yield per gram of the solid product was 46 g. The catalyst efficiency, which was only 1/500 of that in Example 1, is considered extremely low as compared with the polymer yield of 10,000 to 30,000 g per gram of the solid product (III) obtained in the present invention.

Comparative Examples 2 and 3 clearly indicate that polysiloxane would not have the effectiveness shown by the present invention unless it is used as a component of a solid product for carrying a transition metal compound.

COMPARATIVE EXAMPLE 4

Preparation of a solid product and ethylene polymerization were conducted by using said solid product in a similar manner to that in Example 1, except that, in place of the solid product (I) in Example 1 (reaction product of aluminum trichloride with magnesium hydroxide), there was used a solid product obtained by crushing 58 g of commercially available magnesium hydroxide in a vibrating mill for 5 hours, without adding aluminum chloride, followed by heating at 130° C for 10 hours. This resulted in remarkably low catalyst efficiency and a low polymer yield of 250 g per gram of the solid product, indicating that anhydrous aluminum trichloride is an essential component of the solid product (I).

EXAMPLE 2

Preparation of the solid product (III) and polymerization of ethylene were conducted in a similar manner as in Example 1, except that 75 g of magnesium oxide was substituted for 58 g of magnesium hydroxide used in Example 1. The solid product (III) used had a titanium atom content of 10.1 mg per gram of the solid product (III). Polymerization resulted in sufficiently high catalyst efficiency and a high ethylene polymer yield of 20,500 g per gram of the solid product (III). The polymer yield per gram of titanium atoms was 2.0 $\times 10^6$ g. The polymer had a MI of 0.75 and a BD of 0.41, respectively.

COMPARATIVE EXAMPLE 5

Ethylene was polymerized using a solid product obtained as in Example 1, except that, in place of the reaction product of magnesium oxide with aluminum trichloride in Example 1, there was used a solid product obtained by crushing commercially available magnesium oxide alone, in a vibrating mill for 5 hours, followed by heating at 130° C for 10 hours. Polymerization resulted in remarkably low catalyst efficiency and a low ethylene polymer yield of 750 g per gram of the solid product, indicating that aluminum trichloride is an essential component of the catalyst.

COMPARATIVE EXAMPLE 6

In Example 2, the solid product (I) was reacted directly with $TiCl_4$ in toluene, without being reacted with chain dimethylpolysiloxane, to give a solid product having a titanium atom content of 7.8 mg/g. The yield of ethylene polymer was 3,580 g per gram of the solid product, and the polymer had a MI of 0.30. The catalyst efficiency was remarkably lower than in Example 2.

EXAMPLE 3

Preparation of the solid product (III) and polymerization of ethylene were conducted in a similar manner to that of Example 1, except that 80 g of magnesium carbonate was substituted for 58 g of magnesium hydroxide used in Example 1. The solid product (III) had a titanium atom content of 14.7 mg per gram of the solid product (III) and gave an ethylene polymer yield (based upon the unit weight of polymer product (III)), of 18,300 g (polymer)/g (solid product (III)). Namely, a sufficiently high catalyst efficiency was obtained. The polymer yield per gram of titanium atoms was 1.3 $\times 10^6$ g. The polymer had a MI of 1.5 and a BD of 0.45, respectively.

COMPARATIVE EXAMPLE 7

In Example 3, the solid product (I) was reacted directly with $TiCl_4$ in toluene, without being reacted with chain dimethylpolysiloxane, to give a solid product having a titanium atom content of 11.8 mg/g. The yield of ethylene polymer was 2,400 g per gram of the solid product. The polymer had a MI of 0.35, and the catalyst efficiency was remarkably lower than in Example 3.

COMPARATIVE EXAMPLE 8

A solid product (III) containing 8.9 mg of titanium atoms per gram of said product was prepared in a similar manner as in Example 3, except that commercially available magnesium carbonate was substituted for the reaction product of magnesium carbonate and aluminium trichloride used in Example 3, said magnesium carbonate was crushed in a vibrating mill for 5 hours, and heated at 130° C for 10 hours. Using the solid product (III) thus obtained, ethylene was polymerized as in Example 1, to give a polymer yield of 690 g per gram of the solid product (III). The polymer had a MI of 0.25, and the catalyst efficiency was remarkably lower than in Example 3.

EXAMPLE 4

Preparation of a solid product (III) and polymerization of ethylene were conducted in a similar manner as in Example 1, except that 65 g of magnesium chloride (hexa-hydrate) was substituted for 58 g of magnesium hydroxide used in Example 1. The solid product (III) had a titanium content of 19.6 mg per gram of said product. The yield of ethylene polymer was 19,500 g per gram of the solid product (III) or 1.0 $\times 10^6$ g per gram of titanium atoms, indicating sufficiently high catalyst efficiency. The polymer had a MI of 1.5 and a BD of 0.38, respectively.

EXAMPLE 5

Preparation of a solid product (III) and polymerization of ethylene were conducted in a similar manner as in Example 1, except that 65 g of hydromagnesite (expressed as $3MgCO_3 \cdot Mg(OH)_2 \cdot 3H_2O$) was substituted for 58 g of magnesium hydroxide. The solid product (III) had a titanium atom content of 25.4 mg per gram of said solid product. The yield of ethylene polymer was 20,500 g per gram of the solid product (III) or 0.8 $\times 10^6$ g per gram of titanium atoms, indicating sufficiently high catalyst efficiency. The polymer had a MI of 0.95 and a BD of 0.42.

EXAMPLE 6

Preparation of a solid product (III) and polymerization of ethylene were conducted in a similar manner as in Example 1, except that 80 g of manganese chloride (tetra-hydrate) was substituted for 58 g of magnesium hydroxide used in Example 1. The solid product (III) had a titanium atom content of 35.5 mg per gram of the solid product (III). The yield of ethylene polymer was 18,350 g per gram of the solid product (III) or 0.5 $\times 10^6$ g per gram of titanium atoms, indicating sufficiently high catalyst efficiency. The polymer had a MI of 0.55 and a BD of 0.39, respectively.

EXAMPLE 7

Preparation of a solid product (III) and polymerization of ethylene were conducted in a similar manner as in Example 1, except that 70 g of hydrotalcite ($Mg_6Al_2(OH)_{16}CO_3 \cdot 4H_2O$) was substituted for 58 g of magnesium hydroxide used in Example 1. The solid product (III) had a titanium atom content of 5.7 mg per gram of the said product (III). The yield of ethylene polymer was 14,500 g per gram of the solid product (III) or 2.5 $\times 10^6$ g per gram of Ti atoms, indicating sufficiently high catalyst efficiency. The polymer had a MI of 0.69 and a BD of 0.37, respectively.

EXAMPLE 8

Preparation of a solid product (III) and polymerization of ethylene were conducted in a similar manner as in Example 1, except that 70 g of ferric chloride (anhydride) was substituted for aluminum trichloride (anhydride) used in Example 1. The solid product (III) had a titanium atom content of 8.4 mg per gram of the solid product (III). The yield of ethylene polymer was 18,700 g per gram of said product (III) or $2.2 \times 10^6$ g per gram of titanium atoms, indicating sufficiently high catalyst efficiency. The polymer had a MI of 1.4 and a BD of 0.39, respectively.

EXAMPLE 9

Preparation of a solid product (III) and polymerization of ethylene were conducted in a similar manner as in Example 2, except that 75 g of ferric trichloride (anhydride) was substituted for aluminum trichloride (anhydride) used in Example 2. The solid product (III) had a titanium atom content of 12.8 mg per gram of the solid product (III). The yield of ethylene polymer was 12,300 g per gram of the solid product (III) or $1.0 \times 10^6$ g per gram of titanium atoms. The polymer had a MI of 2.3 and a BD of 0.41, respectively.

EXAMPLE 10

Calcium magnesium carbonate ($CaMg(CO_3)_2$) (78 g) and 60 g of ferric trichloride (anhydride) were mixed in a ball mill for 24 hours and heated at 110° C for 5 hours. The mixture was then cooled under nitrogen stream and finely divided to give a solid product (I). Into a 500-ml round-bottomed flask were added 100 g of the solid product (I) and 100 g of dimethylpolysiloxane, and the mixture was reacted at 150° C for 2 hours to give a solid product (II), which was cooled under nitrogen stream. Thereafter, 200 ml of titanium tetrachloride was added to the solid product (II), and the mixture was reacted at 130° C for an hour and worked out as in Example 1 to give a solid product (III). Using this solid product, ethylene was polymerized as in Example 1. The solid product (III) had a titanium content of 18.5 mg per gram of the solid product (III). The yield of ethylene polymer was 11,400 g per gram of the solid product (III) or $0.6 \times 10^6$ g per gram of Ti atoms, indicating sufficiently high catalyst efficiency. The polymer had a MI of 0.78 and a BD of 0.37, respectively.

EXAMPLE 11

Preparation of a solid product (III) and polymerization of ethylene were conducted in a similar manner as in Example 1, except that 200 ml of vanadium tetrachloride was substituted for 200 ml of titanium tetrachloride used in Example 1. The solid product (III) had a vanadium atom content of 15 mg per gram of the solid product (III). The yield of ethylene polymer was 9,800 g per gram of the solid product (III) or $0.7 \times 10^6$ g per gram of Ti atoms. The polymer had a MI of 2.4 and a BD of 0.38, respectively.

EXAMPLE 12

Preparation of a solid product (III) and polymerization of ethylene were conducted in a similar manner as in Example 10, except that 200 ml of vanadium oxytrichloride was substituted for 200 ml of titanium tetrachloride used in Example 10. The solid product (III) had a vanadium atom content of 28 mg per gram of the solid product (III). The yield of ethylene polymer was 7,900 g per gram of the solid product (III) or $0.3 \times 10^6$ g per gram of Ti atoms. The polymer had a MI of 0.94 and a BD of 0.36, respectively.

EXAMPLE 13

Hydrotalcite ($Mg_6Al_2(OH)_{16}.CO_3.4H_2O$) (60 g) and aluminum trichloride (anhydride) (150 g) were ground and mixed in a ball mill for 40 hours. The mixture was then heated at 120° C for 10 hours under nitrogen stream. After cooling, the mixture was finely divided in the ball mill for additional 5 hours to give a solid product (I). Into a 500-ml round-bottomed flask was placed 100 g of the solid product (I) and 200 ml of methylphenylpolysiloxane (having a viscosity of 200 centistokes) was added thereto. The mixture was reacted at 150° C for 4 hours to give a solid product (II).

After the reaction was completed, a solid product (III) was prepared as in Example 1. The solid product (III) thus obtained had a titanium atom content of 24 mg per gram of the solid product (III). Using this solid product, ethylene was polymerized as in Example 1. The yield of ethylene polymer was 23,800 g per gram of the solid product (III) or $1.0 \times 10^6$ g per gram of Ti atoms, indicating sufficiently high catalyst efficiency. The polymer has a MI of 1.5 and a BD of 0.40, respectively.

EXAMPLE 14

Preparation of the solid product (III) and polymerization of ethylene were conducted in a similar manner as in Example 13, except that 200 ml of diphenylpolysiloxane (800 centistokes) was substituted for methylphenylpolysiloxane used in Example 13. The solid product (III) had a titanium content of 18 mg per gram of the solid product (III). The yield of ethylene polymer was 19,500 g per gram of the solid product (III) or $1.1 \times 10^6$ g per gram of Ti atoms. The polymer had a MI of 1.4 and a BD of 0.43, respectively.

EXAMPLE 15

Hydromagnesite ($3MgCO_3.Mg(OH)_2.3H_2O$) (80 g) and 120 g of aluminum trichloride were ground and mixed in a vibrating mill for 5 hours, and then the mixture was heated at 140° C for 8 hours under nitrogen stream. After cooling, the mixture was finely divided in a vibrating mill for additional one hour to give a solid product (I). Into a 500-ml round-bottomed flask was placed 100 g of the solid product (I), and 200 ml of methylpolysiloxane hydride (Toshiba Silicon oil TSF 484 having a viscosity of 16 centistokes, a trademark of product manufactured by Tokyoshibaura Denki Kabushiki Kaisha) was added thereto. The mixture was reacted at 120° C for 2 hours to give a solid product (II). After the reaction was completed, 50 ml of xylene and 150 ml of titanium tetrachloride were added, and the mixture was reacted at 120° C for an hour. The reaction mixture was cooled under nitrogen stream and worked out as in Example 1 to give a solid product (III). The solid product (III) had a titanium atom content of 8.9 mg per gram of the solid product (III).

Ethylene was polymerized as in Example 1. The yield of ehtylene polymer was 24,500 g per gram of the solid product (III) or $2.8 \times 10^6$ g per gram of Ti atoms, indicating sufficiently high catalyst efficiency. The polymer had a MI of 3.5 and a BD of 0.38, respectively.

EXAMPLE 16

Aluminum magnesium oxide ($MgAl_2O_4$) (70 g) and 58 g of aluminum trichloride were ground and mixed in a ball mill for 40 hours, and then the mixture was heated and reacted at 130° C for 5 hours. After cooling, the mixture was finely divided in the ball mill for 10 hours to give a solid product (I). Into a 500-ml round-bottomed flask was placed 100 g of the solid product, and 150 ml of methylpolysiloxane hydride and 100 ml of tetrachloroethylene were added thereto. The mixture was reacted at 120° C for 5 hours to give a solid product (III). After the reaction was completed, the reaction mixture was worked out as in Example 1 to give a solid product (III), which had a titanium content of 13.5 mg per gram of the solid product (III).

Ethylene was polymerized as in Example 1. The yield of ethylene polymer was 27,800 g per gram of the solid product (III) or $2.1 \times 10^6$ g per gram of Ti atoms, indicating sufficiently high catalyst efficiency. The polymer had a MI of 1.8 and a BD of 0.42, respectively.

EXAMPLE 17

Copolymerization of ethylene and propylene was conducted, using the solid product (III) obtained in Example 1.

Air was evacuated from a 5-liter stainless steel reactor and substituted with nitrogen gas. After 3.5 liters of n-hexane, 450 mg of triisobutyl aluminum, and 40 mg of the solid product (III) were placed in the reactor, 250 g of propylene was added. Polymerization reaction was conducted at 85° C for 4 hours under a hydrogen gauge pressure of 0.5 Kg/cm² and an ethylene gauge pressure of 9 Kg/cm². When the reaction was completed, the slurry containing ethylene-propylene copolymer was filtered and dried, without subjecting it to deashing step, to give 790 g of a white copolymer. The copolymer had a MI of 1.4 and a BD of 0.41, respectively. The yield of copolymer was 19,800 g per gram of the solid product (III) or $2.6 \times 10^6$ g per gram of Ti atoms. The propylene content of the copolymer was 14%.

EXAMPLE 18

Copolymerization of ethylene and styrene was conducted, using a solid product (III) obtained in Example 1.

Air was evacuated from a 5-liter stainless steel reactor and was substituted with nitrogen gas. After 3.5 liters of n-hexane, 380 mg of monoethoxy-diethyl-aluminum ($Et_2Al(OEt)$) and 49 mg of the solid product (III) were placed in the reactor, 180 g of styrene was added. Polymerization reaction was conducted at 60° C for 5 hours under a hydrogen gauge pressure of 1 Kg/cm² and an ethylene gauge pressure of 8 Kg/cm². When the reaction was completed, the slurry was filtered and dried, without subjecting it to deashing step, to give 820 g of a white copolymer having a MI of 1.8. The yield of this copolymer was 16,700 g per gram of the solid product (III) or $2.2 \times 10^6$ g per gram of Ti atoms. The copolymer had a BD of 0.41 and a styrene content of 3.5%, respectively.

EXAMPLE 19

Copolymerization of ethylene and butene-1 was conducted, using a solid product (III) obtained in Example 1.

Following the procedure of Example 17, 3.5 liters of n-hexane, 480 mg of diethylaluminum monochloride and 80 mg of the solid product (III) were placed in the reactor, and thereafter 120 g of butene-1 was added. Polymerization reaction was conducted at 90° C for 5 hours under a hydrogen gauge pressure of 2 Kg/cm² and an ethylene gauge pressure of 8 Kg/cm². When the reaction was completed, the slurry containing polymer was filtered and dried, without subjecting it to deashing step, to give 850 g of a white polymer having a MI of 0.5. The yield of copolymer was 10,600 g per gram of the solid product (III) or $1.4 \times 10^6$ g per gram of Ti atoms. The copolymer had a BD of 0.42 and a butene-1 content of 5.6%, respectively.

What is claimed is:

1. In the method for producing a polymer or copolymer of ethylene which comprises polymerizing ethylene or copolymerizing ethylene with another olefin in the presence of a catalyst obtained by combining a solid product containing a transition metal of group 4a or group 5a of the Periodic Table, with an organoaluminum compound, the improvement which comprises using as said solid product, a solid product (III) obtained by
    1. reacting Al Cl₃ or Fe Cl₃ (A) with a divalent metal compound or derivative thereof (B) selected from the group consisting of hydroxides, oxides and carbonates of a divalent metal, double oxides consisting of a divalent metal oxide and another valent-metal oxide, hydrates of halides of a divalent metal, hydrates of addition compounds of an oxide to a halide, of a divalent metal, hydrates of double oxides consisting of oxides selected from those of divalent metals, hydrates of addition compounds of a carbonate to a hydroxide, of a divalent metal, and hydrates of hydroxycarbonates containing a divalent metal, to obtain a solid product (I),
    2. reacting the resulting solid product (I) with a chain or cyclic polysiloxane (C) expressed by the general formula,

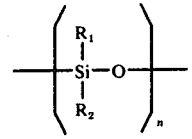

wherein $R_1$ and $R_2$ are same or different kinds and each mean hydrogen atom, alkyl group, aryl group, halogen atom, alkoxy group, aryloxy group or aliphatic carboxylic acid residual radical, and n is in the range of 3 – 10,000, to obtain a solid product (II), and
    3. reacting the resulting solid product (II) with a liquid transition metal compound (D) to obtain said solid product (III).

2. A method according to claim 1 wherein said polysiloxane is a liquid alkylpolysiloxane, arylpolysiloxane, alkylarylpolysiloxane, alkylhydrogenpolysiloxane, haloalkylpolysiloxane, haloarylpolysiloxane, and has a viscosity of 10 – 10,000 centistokes.

3. A method according to claim 1 wherein said polysiloxane is an alkylpolysiloxane selected from the group consisting of octamethyltrisiloxane, octaethylcyclotetrasiloxane, dimethylpolysiloxane, ethylpolycyclosiloxane, methylethylpolysiloxane and has a viscosity of 10 – 1,000 centistokes.

4. A method according to claim 1 wherein said polysiloxane is an arylpolysiloxane selected from the group consisting of hexaphenylcyclotrisiloxane and diphenylpolysiloxane and has a viscosity of 10 – 1,000 centistokes.

5. A method according to claim 1 wherein said polysiloxane is an alkylarylpolysiloxane selected from the group consisting of diphenyloctamethyltetrasiloxane and methylphenylpolysiloxane and has a viscosity of 10 – 1,000 centistokes.

6. A method according to claim 1 wherein said polysiloxane is methylhydrogenpolysiloxane and has a viscosity of 10 – 1,000 centistokes.

7. A method according to claim 1 wherein the reaction of said solid product (I) with said polysiloxane (C) is carried out by adding 10 – 1,000 g of said polysiloxane (C) to 100 g of said solid product (I), and at a temperature of 20°– 300° C for 10 minutes — 5 hours.

8. A method according to claim 7 wherein said reaction of said solid product (I) with said polysiloxane (C) is carried out in the presence of a solvent.

9. A method according to claim 1 wherein, as said solid product (II) to be reacted with said liquid transition metal compound (D), a slurry formed at the time of completion of said reaction (2) is used, as it is, in the next step (3).

10. A method according to claim 1 wherein, as said product (II) to be reacted with said liquid transition metal compound (D), a solid product isolated by separating the reaction product of said solid product (I) with said polysiloxane (C), by filtration, and eliminating unreacted polysiloxane by washing with a solvent, is used in the next step (3).

11. A method according to claim 1 wherein said divalent metal compound or derivative thereof is selected from the group consisting of $Mg(OH)_2$, $Ca(OH)_2$, $Zn(OH)_2$, $Mn(OH)_2$, MgO, CaO, ZnO, MnO, $MgAl_2O_4$, $Mg_2SiO_4$, $Mg_6MnO_8$, $MgCO_3$, $MnCO_3$, $MgCO_3 \cdot CaCO_3$, $SnCl_2 \cdot 2H_2O$, $MgCl_2 \cdot 6H_2O$, $NiCl_2 \cdot 6H_2O$, $MnCl_2 \cdot 4H_2O$, $KMgCl_3 \cdot 6H_2O$, $8MgO \cdot MgCl_2 \cdot 15H_2O$, $3MgO \cdot 2SiO_2 \cdot 2H_2O$, $3MgCO_3 \cdot Mg(OH)_2 \cdot 3H_2O$ and $Mg_6Al_2(OH)_{16}CO_3 \cdot 4H_2O$.

12. A method according to claim 1 wherein the mixing proportion of said halide of trivalent metal (A) and said divalent metal compound or derivative thereof (B) is 0.1 – 20 as expressed in the atomic ratio of the divalent metal to the trivalent metal.

13. A method according to caim 1 wherein the reaction temperature of said (A) and said (B) is in the range of 50° – 300° C.

14. A method according to claim 1 wherein said liquid transition metal compound is selected from the group consisting of halides, oxyhalides, alcoholates, alkoxy halides and acetoxy halides of titanium or vanadium.

15. A method according to claim 1 wherein said liquid transition metal compound is selected from the group consisting of $TiCl_4$, $TiBr_4$, tetraethoxytitanium, tetrabutoxytitanium, monochlorotributoxy titanium, dichlorodibutoxytitanium, trichloromonoethoxytitanium, vanadium tetrachloride and vanadium oxytrichloride.

16. A method according to claim 1 wherein said organoaluminum compound is selected from the group consisting of trialkylaluminum, dialkylaluminum monochloride, alkylaluminum dichloride and alkoxyalkylaluminum.

17. A method according to claim 1 wherein said another olefin to be copolymerized with ethylene is selected from the group consisting of propylene, butene-1, hexene-1, octene-1, decene-1, 4-methyl-pentene-1 and butadiene.

18. In the method for producing a polymer or copolymer of ethylene which comprises polymerizing ethylene or copolymerizing ethylene with another olefin in the presence of a catalyst obtained by combining a solid product containing titanium or vanadium, with an organoaluminum compound,
the improvement which comprises using as said solid product, a solid product (III) obtained by
1. mixing a halide of a trivalent metal (A) selected from the group consisting of aluminum trichloride and ferric chloride, with a divalent metal compound or derivative thereof (B) selected from the group consisting of hydroxides, oxides and carbonates of Mg, Ca, Zn or $Mn^{II}$, double oxides consisting of oxides of Mg, Ca, Zn or $Mn^{II}$ and another valent-metal oxide, hydrates of halides of Mg, Ca, Zn or $Mn^{II}$, hydrates of double halides consisting of a halide of Mg, Ca, Zn or $Mn^{II}$ and another valent-metal halide, hydrates of addition compounds of an oxide to a halide, of Mg, Ca, Zn or $Mn^{II}$, hydrates of double oxides consisting of oxides selected from those of Mg, Ca, Zn or $Mn^{II}$, hydrates of addition compounds of a carbonate to a hydroxide, of Mg, Ca, Zn or $Mn^{II}$, and hydrates of hydroxycarbonates containing Mg, Ca, Zn or $Mn^{II}$,
in a mixing ratio of said halide of trivalent metal (A) and said divalent metal compound or derivative thereof (B) of 1 – 10, as expressed in the atomic ratio of the divalent metal to the trivalent metal, and reacting the resulting mixture at a temperature of 50° – 300° C, to obtain a solid product (I),
2. adding to the resulting solid product (I), a liquid chain or cyclic polysiloxane (C) having a viscosity of 10 – 1,000 centistokes at 25° C and expressed by the general formula, $$\left( \begin{array}{c} R_1 \\ | \\ Si-O \\ | \\ R_2 \end{array} \right)_n$$

wherein $R_1$ and $R_2$ are same or different kinds and each mean hydrogen atom, alkyl group, aryl group, halogen atom, alkoxy group, aryloxy group or aliphatic carboxylic acid residual radical, and n is in the range of 3 – 10,000, in a proportion of 10 – 1,000 g of said polysiloxane per 100 g of said solid product (I), and reacting the resulting mixture at a temperature of 60° – 200° C, to obtain a solid product (II), and
3. adding to the resulting solid product (II), a liquid transition metal compound (D) selected from the group consisting of halides, oxyhalides, alcoholates, alkoxyhalides and acetoxyhalides, or titanium or vanadium, in a proportion of 10 – 500 g of said liquid transition metal compound per 100 g of said solid product (II), and reacting the resulting mixture at a temperature of 80° – 200° C, to obtain said solid product (III).

* * * * *